(12) United States Patent
Rudolph et al.

(10) Patent No.: US 12,269,211 B2
(45) Date of Patent: Apr. 8, 2025

(54) ADDITIVE MANUFACTURING PROCESS CONTINUOUS REINFORCEMENT FIBERS AND HIGH FIBER VOLUME CONTENT

(71) Applicant: Wisconsin Alumni Research Foundation, Madison, WI (US)

(72) Inventors: Natalie Rudolph, Madison, WI (US); Thomas W. Pfeifer, Madison, WI (US); Thomas W. C. Laduch, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 1445 days.

(21) Appl. No.: 15/165,671

(22) Filed: May 26, 2016

(65) Prior Publication Data

US 2017/0341300 A1    Nov. 30, 2017

(51) Int. Cl.

| | | |
|---|---|---|
| *B29C 64/165* | (2017.01) | |
| *B29B 13/02* | (2006.01) | |
| *B29C 64/118* | (2017.01) | |
| *B29C 64/20* | (2017.01) | |
| *B29C 64/209* | (2017.01) | |
| *B29C 64/218* | (2017.01) | |
| *B29C 64/386* | (2017.01) | |
| *B29C 64/40* | (2017.01) | |
| *B33Y 10/00* | (2015.01) | |
| *B33Y 30/00* | (2015.01) | |

(Continued)

(52) U.S. Cl.
CPC .......... *B29C 64/165* (2017.08); *B29B 13/02* (2013.01); *B29C 64/118* (2017.08); *B29C 64/20* (2017.08); *B29C 64/209* (2017.08); *B29C 64/386* (2017.08); *B29C 64/40* (2017.08); *B33Y 10/00* (2014.12); *B33Y 30/00* (2014.12); *B33Y 50/02* (2014.12); *B33Y 70/10* (2020.01); *B29B 15/122* (2013.01); *B29K 2063/00* (2013.01); *B29K 2105/08* (2013.01)

(58) Field of Classification Search
CPC ....... B29C 64/00; B29C 64/10; B29C 64/141; B29C 64/147; B29C 64/165; B29C 64/171; B29C 64/118; B29C 64/218; B29C 64/20; B33Y 10/00
See application file for complete search history.

(56) References Cited

U.S. PATENT DOCUMENTS

| | | | |
|---|---|---|---|
| 9,156,205 B2 | 10/2015 | Mark et al. | |
| 2006/0070697 A1* | 4/2006 | Hoffmann | B29C 70/382 |
| | | | 156/166 |

(Continued)

OTHER PUBLICATIONS

CGR Products, "IBM's "Indestructible" Thermosetting Polymer: Polyhexahydrotriazine", Published Jun. 15, 2015, cgrproducts.com. (Year: 2015).*

(Continued)

*Primary Examiner* — Philip Y Louie
*Assistant Examiner* — Sonny V Nguyen
(74) *Attorney, Agent, or Firm* — Boyle Fredrickson, SC

(57) ABSTRACT

An additive printer dispenses filament having high volume content of axial reinforcing fibers impregnated with a partially cured thermoset material. Partial curing provides sufficient mechanical integrity for high-density fiber support and retention while maintaining tackiness necessary to allow layer by layer additive construction. The complete construction may then be heated to provide complete curing.

4 Claims, 6 Drawing Sheets

(51) Int. Cl.
*B33Y 50/02* (2015.01)
*B33Y 70/10* (2020.01)
*B29B 15/12* (2006.01)
*B29K 63/00* (2006.01)
*B29K 105/08* (2006.01)

(56) References Cited

U.S. PATENT DOCUMENTS

| | | | | |
|---|---|---|---|---|
| 2011/0011537 | A1* | 1/2011 | Hamlyn | B29C 70/384 |
| | | | | 156/436 |
| 2013/0267136 | A1* | 10/2013 | Salnikov | C08G 59/56 |
| | | | | 442/1 |
| 2015/0108677 | A1* | 4/2015 | Mark | B29C 70/20 |
| | | | | 264/138 |
| 2015/0291833 | A1* | 10/2015 | Kunc | C09D 163/00 |
| | | | | 428/413 |
| 2016/0046831 | A1* | 2/2016 | Boday | B29C 64/00 |
| | | | | 264/401 |
| 2016/0264734 | A1* | 9/2016 | Boday | C08G 73/0273 |
| 2016/0354896 | A1* | 12/2016 | Lewis | B33Y 80/00 |
| 2017/0015059 | A1* | 1/2017 | Lewicki | B29C 64/118 |

OTHER PUBLICATIONS

Alexander Chaloupka et al.; Detection and Modelling of Thermal and Rheological Transitions of a 2-Step-Curing Thermoset Using Dielectric and Standard Measuring Techniques; 20th International Conference on Composite Materials Copenhagen, Jul. 19-24, 2015; pp. 1-10; Denmark.

* cited by examiner

ADDITIVE MANUFACTURING PROCESS CONTINUOUS REINFORCEMENT FIBERS AND HIGH FIBER VOLUME CONTENT

CROSS REFERENCE TO RELATED APPLICATIONS

- - -

STATEMENT REGARDING FEDERALLY SPONSORED RESEARCH OR DEVELOPMENT

- - -

BACKGROUND OF THE INVENTION

The present invention relates to additive manufacturing ("3-D printing") and in particular to an additive manufacturing process for "printing" polymer materials having continuous reinforcement fibers of controlled orientation, combined with a high fiber volume content.

Common additive manufacturing printers may make use of a filament of thermoplastic material that is heated and extruded through a nozzle as the nozzle is moved with respect to a surface in three dimensions. Heated thermoplastic material is deposited by the nozzle to build up a three-dimensional product layer by layer. As each layer of thermoplastic cools and hardens, it forms support for the subsequent layers.

Additive manufacturing techniques such as this greatly simplify the prototyping process and can be used to manufacture products that are not easily fabricated by alternative techniques, including, for example, objects with complex internal voids.

The strength of pure thermoplastic materials is limited and accordingly reinforcing fibers such as carbon, glass or aramid fibers may be introduced into the thermoplastic printing filament. This technique is limited to relatively low concentrations of continuous fiber (about 15 percent) or relatively short fiber lengths that do not interfere with the extrusion process, but provide lower performance enhancement.

U.S. Pat. No. 9,156,205 describes an additive printer that can work with a thermoplastic filament containing axially aligned substantially continuous reinforcing fibers. The outer surface of the thermoplastic material of this fiber can be heated so that it may stick to earlier layers of the fiber to build up a three-dimensional surface. While U.S. Pat. No. 9,156,205 primarily describes a thermoplastic material, it notes without further explanation that partially cured epoxy may be used. As noted elsewhere in the application, however, fibers located in soft materials such as uncured epoxy are likely to become clogged in the nozzle and delaminate during deposition.

SUMMARY OF THE INVENTION

The present invention provides an additive printing process using high strength thermoset materials reinforced with a high fiber volume content of continuous axial fibers. The challenge of ensuring mechanical integrity of the fiber/thermoset filament while the filament can be adhered to other filaments is managed through the use of a two-step curing thermoset or a temperature-managed partially cured thermoset. By raising the filament to a first curing temperature, a tractable, mechanically robust filament is obtained that can nevertheless be adhered to other filaments due to the tackiness, of the outer surface. A second stage of curing at a higher temperature completes the cross-linking of the adhered layers to provide the benefits of high strength thermoset materials.

Specifically, the invention, in one embodiment, provides a method of additive manufacturing that impregnates reinforcing fibers extending along a filament axis with an uncured two-step curing thermoset material having a first reaction temperature and a second higher reaction temperature to produce an impregnated filament. The filament is heated to a first reaction temperature but less than the second higher reaction temperature to provide a substantially complete first chemical reaction in the thermoset material without initiating a different second chemical reaction in the thermoset material to create a partially cured filament having an adhesive outer surface. This partially cured filament is applied in multiple layers over an area to construct a three-dimensional object of partially cured filament segments retained in position by inter-engagement of their outer adhesive surfaces. Finally, the three-dimensional object is heated to the second higher reaction temperature to substantially complete the second chemical reaction.

It is thus a feature of at least one embodiment of the invention to provide a practical printing of continuous reinforced strands with a high fiber volume content. By employing a two-step curing process, a robust but flexible filament may be created that can be manipulated and applied to a surface while retaining a high density of reinforcement fibers yet having sufficient surface adhesion necessary to allow assembly of a three-dimensional-structure.

The first reaction temperature may form polymer chains and/or cross-linking between a first two reactants and wherein the second reaction temperature forms polymer chains and/or cross-linking with a third reactant different from the first and second reactants.

It is thus a feature of at least one embodiment of the invention to provide a partially cured filament having two distinct curing temperatures allowing arbitrary processing time with final curing triggered only by reaching the second temperature.

Step (c) may press the partially cured filament to an earlier layer of partially cured filament using a roller.

It is thus a feature of at least one embodiment of the invention to permit higher assembly pressures without corresponding friction or disruption to the filament attendant to pressure by a stationary nonmoving foot element.

The roller may provide an elastomeric outer circumference for contact with the partially cured filament.

It is thus a feature of at least one embodiment of the invention to provide a roller with reduced adhesion to partially cured filaments and that can provide a simultaneous retaining pressure on nearby filaments during assembly by flexure.

In one embodiment the invention may provide a method that impregnates reinforcing fibers extending along a filament axis with an uncured thermoset material that need not be a two stage curing thermoset. Again the impregnated filament may be heated to create a partially cured filament having an adhesive outer surface but then cooled to provide mechanical tractability with reduced adhesion in the outer surface. The cooled and partially cured filament is then conducted to a print surface and reheated to restore adhesion still without completion of the cure of the thermoset material. Before complete curing of the reheated partially cured filament, the partially cured filament may be applied in multiple layers over an area to construct a three-dimensional object of partially cured filament segments retained in position by inter-engagement of their outer adhesive surfaces. Finally, the three-dimensional object may be heated to complete curing of the thermoset material.

It is thus a feature of at least one embodiment of the invention to work with thermoset impregnated filament while preserving necessary tackiness for assembly of the filament into a structure. By intermediate cooling, the filament may be temporarily rendered more mechanically robust for handling without separation and adhesion and then reheated immediately before application to the structure.

The heating of step (b) may be performed in a pultrusion die in which the reinforcing fibers are impregnated with the uncured thermoset material.

It is thus a feature of at least one embodiment of the invention to make use of a pultrusion system for generating fiber reinforced filaments using uncured resin. The pultrusion system allows high fiber density without fiber buckling and rendered possible by the ability to produce a fiber by cooling or through the use of a two cure stage thermoset material that is sufficiently mechanically robust to be subject to downstream tensioning.

The method may include the step of pulling the fibers during steps (a) and (b) using at least one motorized roller engaging the impregnated filament downstream the cooling of step (c).

It is thus a feature of at least one embodiment of the invention to provide a filament that can accommodate a downstream motorized roller system without damage or undue adhesion.

The motorized roller may provide a substantially constant rate of pulling of the fibers during steps (a) and (b) and in the method may further use a take-up guide receiving filament after the motorized roller temporarily store variable amounts of filament before it is applied at step (e) when an application rate of the partially cured filament to a previous layer differs from the constant rate of pulling of the fibers.

It is thus a feature of at least one embodiment of the invention to allow a system particularly well adapted to use with partially cured fiber in which cure time must be carefully controlled by allowing a constant curing process that can accommodate variable printing speeds necessary for printing system.

These particular objects and advantages may apply to only some embodiments falling within the claims and thus do not define the scope of the invention.

DETAILED DESCRIPTION OF THE PREFERRED EMBODIMENT

Figure 1:
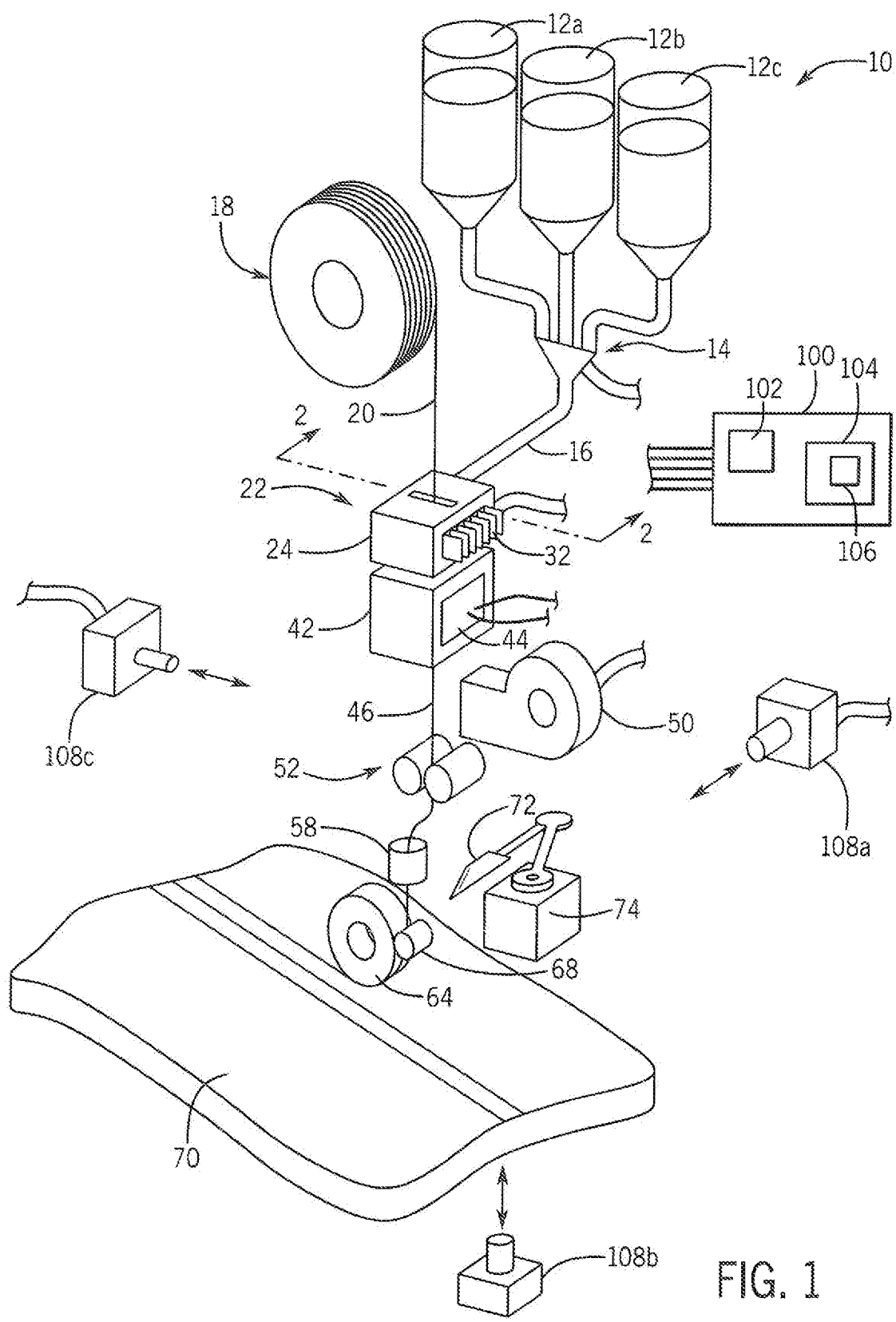
FIG. 1 is an exploded representation of a printer suitable for use with the present invention having computer-controlled x, y, and z Cartesian stage for moving a pultrusion die over a work surface.

Referring now to FIG. 1, an additive printer 10 suitable for use with the present invention may provide for multiple resin reservoirs 12a-c providing materials for the creation of a two-step curing thermoset material. For example, the reservoirs may provide for the ingredients of Daron ZW 015864, a pultrusion-grade, two-step curing thermoset material commercially available from DSM Composite Resins, Zwolle, NL. This material is described in detail in Chaloupka, A., Bezerra, R., Madaksira, V., Taha, I., Rudolph, N., "Detection and Modelling of Thermal and Rheological Transitions of a 2-Step-Curing Thermoset Using Dielectric and Standard Measuring Techniques", 20th International Conference on Composite Materials, Copenhagen, 19-24 Jul., 2015.

As is generally understood in the art, "thermoset" materials are polymers that may be distinguished from "thermoplastics" by the existence of extensive cross-linking, between polymer chains. This cross-linking gives thermoset materials greater strength and resistance to softening upon heating in comparison to thermoplastic materials. Generally thermoset materials that are fully cured do not exhibit meaningful thermal plasticity but degrade before their melting point is reached.

In contrast to a regular thermoset material, a two-step curing thermoset material has two distinct curing temperatures. The first curing temperature promotes a first chemical reaction between a first two reactants producing one or both of cross-linking and long chain formation. This temperature will be termed herein a first curing temperature and produces a "B-stage" material with a rubber-like consistency. At some temperatures the B-stage material can exhibit a surface tackiness that is exploited in the present invention. This stage provides substantially complete reaction of the first two reactants with each other and may be maintained substantially indefinitely so long as a second curing temperature is not exceeded.

During a higher temperature, termed herein the second curing temperature, a second chemical reaction occurs including a previously unreacted third reactant. This third reactant may react with a fourth reactant (in a four component system) or with one or both of the first and second reactants. In this regard it represents a different chemical reaction than the chemical reaction that occurs at the first curing temperature.

The components of the reservoirs 12 components may be mixed, for example, by an impingement mixer 14 either through gravity feed or under the influence of a pump to provide a predetermined ratio of these ingredients to provide an uncured two-step curing thermoset material at a desired flow rate passing out through feed line 16.

Alternatively, the reservoirs 12 may hold a single step curing thermoset material for example a two component epoxy or the like. Here the partial curing represents an incomplete single reaction. In this ease the filament may have some mechanical robustness beyond that of the uncured resin but the partially cured state will typically proceed to completion as a function of temperature and time and thus the state cannot be maintained indefinitely.

A creel 18 of reinforcing fiber 20, for example, carbon, glass, or aramid fiber, contains a multi-fiber strand with each fiber having a diameter suitable to provide for high flexibility, for example, in the range of 0.010-0.030 inches and provided in a continuous length, on the creel, of many yards. The fibers 20 may be substantially parallel. However, instead of unidirectional fibers various 2D textiles could be impregnated and deposited, such as braided, woven, non-crimp or non-woven textiles in various widths as is understood in the art.

Figure 2:
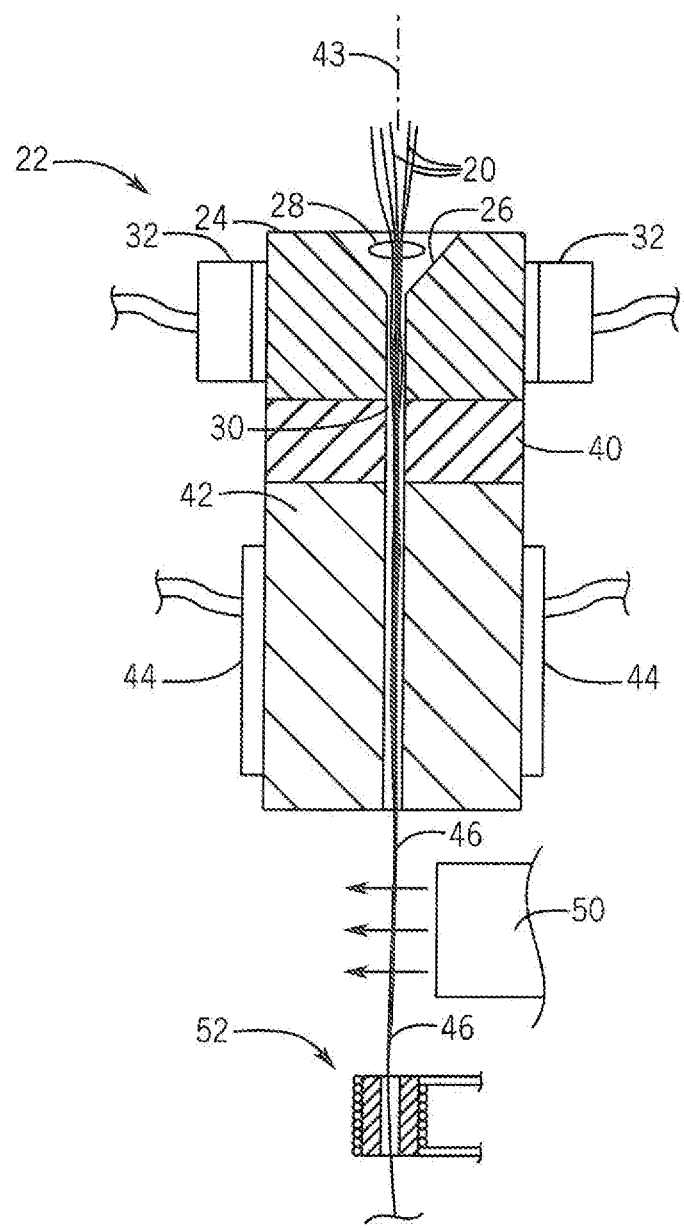
FIG. 2 is an elevational cross-sectional view of the pultrusion die taken along line 2-2 of FIG. 1 showing thermally isolated impregnation and curing stages followed by subsequent cooling and reheating of the elements.

Referring now also to FIG. 2, the fiber 20 may be received at a pultrusion die 22 providing a first, cooled, reducer die 24 providing an upwardly exposed, tapered or funnel-shaped opening 26 for receiving the fibers 20 and directing them past a nozzle 28 in a wall of the opening 26. The orifice 28 communicates with the feed line 16 so that fibers 20 passing by the orifice 28 may be coated with the uncured two-step curing thermoset material. At the lower end of the, opening 26, fibers pass into a die section 30 having a desired cross-section of the filament 46 to be produced and being generally rectangular in cross-section in this example.

Figure 6:
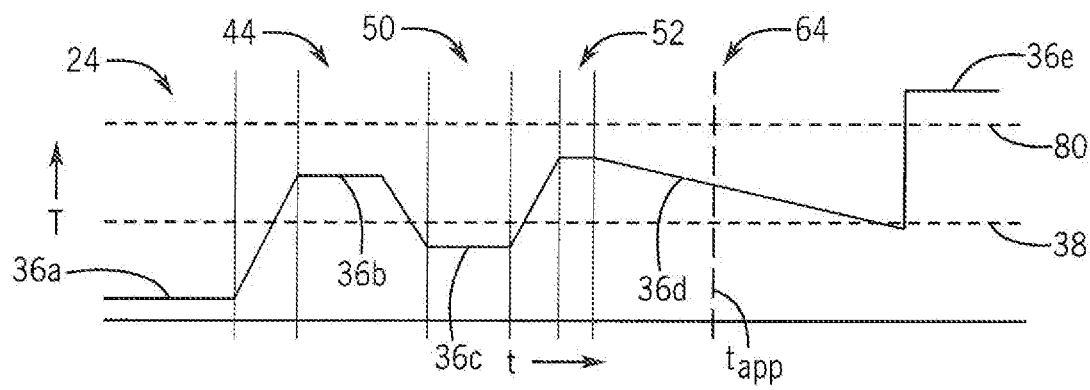
FIG. 6 is a plot of filament temperature as the filament passes through the apparatus of FIG. 1 and ultimately to a second cure stage, showing two different curing processes that occur at different reaction temperatures.

Referring also to FIG. 6, reducer die 24 may be cooled, for example, by a fan, water, coolant or Peltier coolers 32 operating in feedback mode with a thermal sensor or curing sensor (not shown) on the reducer die 24 to maintain the temperature 36a of the uncured two-step curing thermoset material below a first reaction temperature 38, and generally close to room temperature, while still allowing free flow of the uncured two-step curing thermoset material for good contact with the fibers 20.

The coated fibers 20 next pass through a thermal stop 40, for example, being a polymer material with high thermal resistance, and into a heated die 42 where, in the case of a two-step curing resin, the temperature of the coated fibers 20 rises to temperature 36b being above the first reaction temperature 38 but below a second reaction temperature 80. When a single-step resin is used, the temperature is controlled so as to provide a partial curing irrespective of any second reaction temperature.

The heated die 42 has the same cross-section as is provided by the lower portion of the reducer die 24 and may be heated, for example, with resistive heating elements 44 also operating in feedback mode according to a thermal or curing sensor on the heated die 42 (not shown). The reducer die 24 and the heated die 42 may be constructed of a high conductivity metal material to provide for uniform heat distribution.

Figure 3:
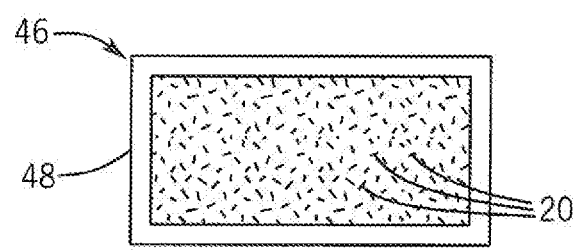
FIG. 3 is a cross-sectional view through a filament output from the pultrusion die of FIG. 1 in the plane of FIG. 2 showing the high fiber volume content and one possible cross-section with a resin rich outer surface.

Referring now also to FIG. 3, a partially cured filament 46 may exit the heated die 42 along axis 43 generally coaxial with the passages through the reducer die 24 and heated die 42 and may have extremely high density of fibers 20 compressed and centered at its core with a thin outer skin of the same partially cured thermoset material 48 (the apparent boundary line in the figure denotes the edge of the fiber bundle and not anew thermoset material). The density by volume of fibers 20 in the partially cured filament 46 will be in excess of 50 percent and preferably in excess of 65 percent and desirably as high as 80 percent.

Immediately upon leaving the heated die 42, the partially cured thermoset material 48 may be undesirably tacky and malleable particularly in the case of a one-step thermoset material. Accordingly, the filament 46 passes through a cooling zone provided by a cooling gas strewn 50 (for example chilled air or gasified liquid nitrogen) which brings the filament 46 to temperature 36c (shown in FIG. 6) below the first reaction temperature 38 to provide improved mechanical robustness and decreased tackiness for handling and to greatly slow the rate of curing in the one-step curing resin material.

As shown in FIG. 1, the filament 46 may then be received, by a capstan assembly 52 providing two interengaging and counter-rotating elastomeric rollers or conveyor belts that engage the filament 46 to pull it downward through the pultrusion die 22. Capstan assembly 52 is operated by a motor 55 (shown in FIG. 4) to provide precise speed and rotational control. The rotational speed of the capstan assembly 52 may be coordinated with the speed at which filament 46 is applied to a three-dimensional form (as discussed below) and/or with the temperature of the heated die 42 through computer control.

After passing through the capstan assembly 52, filament 46 may again be heated to temperature 36d above the first reaction temperature 38 but below a second reaction temperature 80 in the case of a two-step curing thermoset material. With a one-step curing thermoset material this heating step restores tackiness. Ideally this temperature 36d heats the outer surface of the filament superficially to restore the tackiness while preserving the mechanical integrity of the filament core and without accelerating the curing process. This heating may, for example, be provided by a resistively heated collar 58 surrounding the filament 46 providing radiative heating to the outer surface of the filament 46. Other methods of heating, including induction heating, laser, hot gun, UV light source, may also be used.

Figure 4:
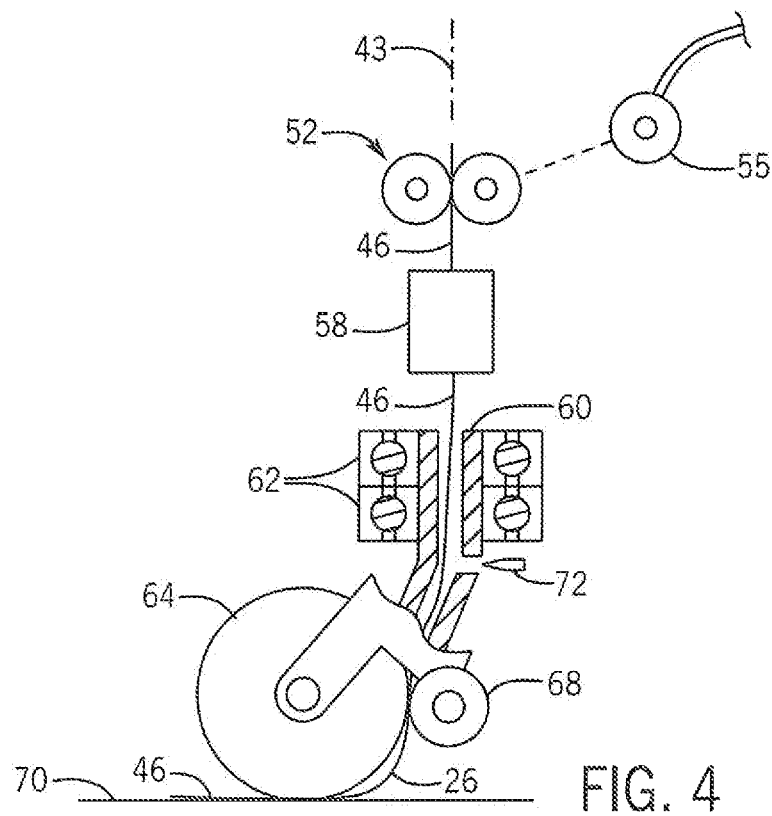
FIG. 4 is an elevational fragmentary view in partial cross-section of a roller for applying the filament under pressure to the work surface.

Referring now to FIGS. 1 and 4, the filament 46 may then pass through a hollow roller support shaft 60 having a bore extending generally along axis 43 and supported by bearings 62 to rotate about the axis 43. A distal end of the support shaft 60 holds a roller 64 having an outer surface of elastomeric material and mounted for rotation along an axis 66 perpendicular to axis 43 and offset from the axis 43 by approximately the radius of the roller 64. In this way the filament 46 may pass through the hollow shaft 60 to be received tangentially at an edge of the roller 64, for example, as guided by portions of the support shaft 60 and a secondary roller 68. As guided, the filament 46 may pass downward along the circumference of the roller 64 to be pressed between the roller 64 and a laminating surface 70 which may either be a motorized stage or previously applied layers of filament 46 applied to the laminating surface 70. The filament 46 dispensed from the roller 64 adheres to the laminating surface 70 so that placement of the filament 46 and multiple layers builds up a desired three-dimensional surface. The offset between the axis 66 and the axis 43 and hence the contact between the roller 64 and the laminating surface 70 causes the roller 64 to swivel to remain naturally perpendicular to a direction of travel of the shaft 60 (maintaining alignment with axis 43) as filament 46 is applied to the lamination surface 70.

As shown in FIG. 6, the heat provided by heated collar 58 restores sufficient tackiness to the outer surface of the filament 46 by a thermoplastic softening so that at a time $t_{app}$ at which the filament 46 is applied to the surface 70, the filament 46 will adhere to the lamination surface 70 under pressure from the roller 64. The elastomeric material of the roller 64 resists adhesion thereto.

Figure 5:
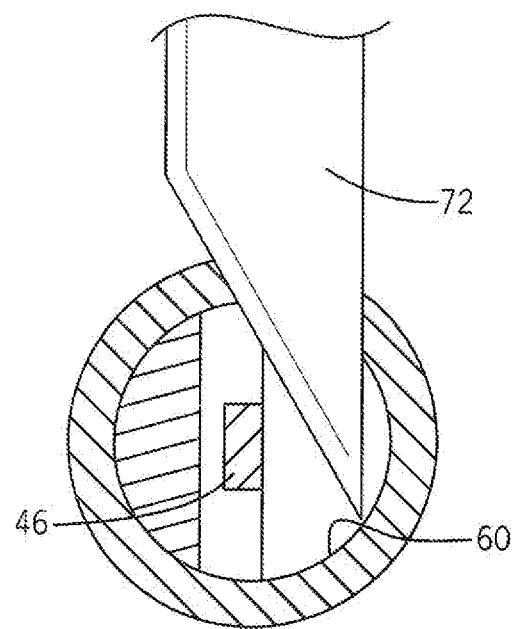
FIG. 5 is a fragmentary cross-sectional view of a knife blade extending perpendicular to the plane of FIG. 4 for severing the filament.

Referring also to FIG. 5, a lower portion of the shaft 60 includes a notch to receive a knife blade 72 operable by a actuator 74 (shown in FIG. 1) that may cut across the filament 46 in the manner of a guillotine close to the roller 64 so that short noncontinuous segments of filament 46 may be applied to the lamination surface 70. Typically the segments will be much longer than (at least ten times) the length of the shortest cross-sectional dimension of the filament 46.

Referring again to FIG. 1 the components described above, including a pump associated with the mixer 14, the Peltier coolers 32, the resistive heating elements 44, the cooling gas stream 50, the motor 55 controlling the capstan assembly 52, the heated collar 58, and the knife blade actuator 74, may be controlled by electronic computer 100 having a processor 102 communicating with a memory 104 holding a stored program 106 for controlling each of these components according to the above description. The Computer 100 may also communicate with axes motors 108*a-c*, for example, stepper motors or servomotors, serving to move the assembly of the pultrusion die 22 through the roller 64 in three orthogonal dimensions with respect to the lamination surface 70. In this way, multiple segments of filament 46 may be applied on top of each other in an arbitrary pattern and relative direction to build up a three-dimensional shape according to control programs generally understood in the art of 3-D additive printing. In addition, these programs provide for the control of the knife blade 72 of FIG. 5 to cut the filament 46 on command or automatically where a printing layer ends or where a radius of curvature of the trajectory of application of the filament 46 would be too small.

Retelling to FIG. 6, once the lamination process is complete, the assembled segments of filament 46 adhered to the lamination surface 70 may be heated to temperature 36*e* being above the second reaction temperature to fully cure the filaments 46 in their adhesive relationship with each other. In this final curing process, the chain length of polymers cross-link fully completing the second chemical reaction. In the case of a one-step thermosetting material, this heating simply accelerates the curing process of a single chemical reaction that had previously been begun until it is complete.

Figure 7:
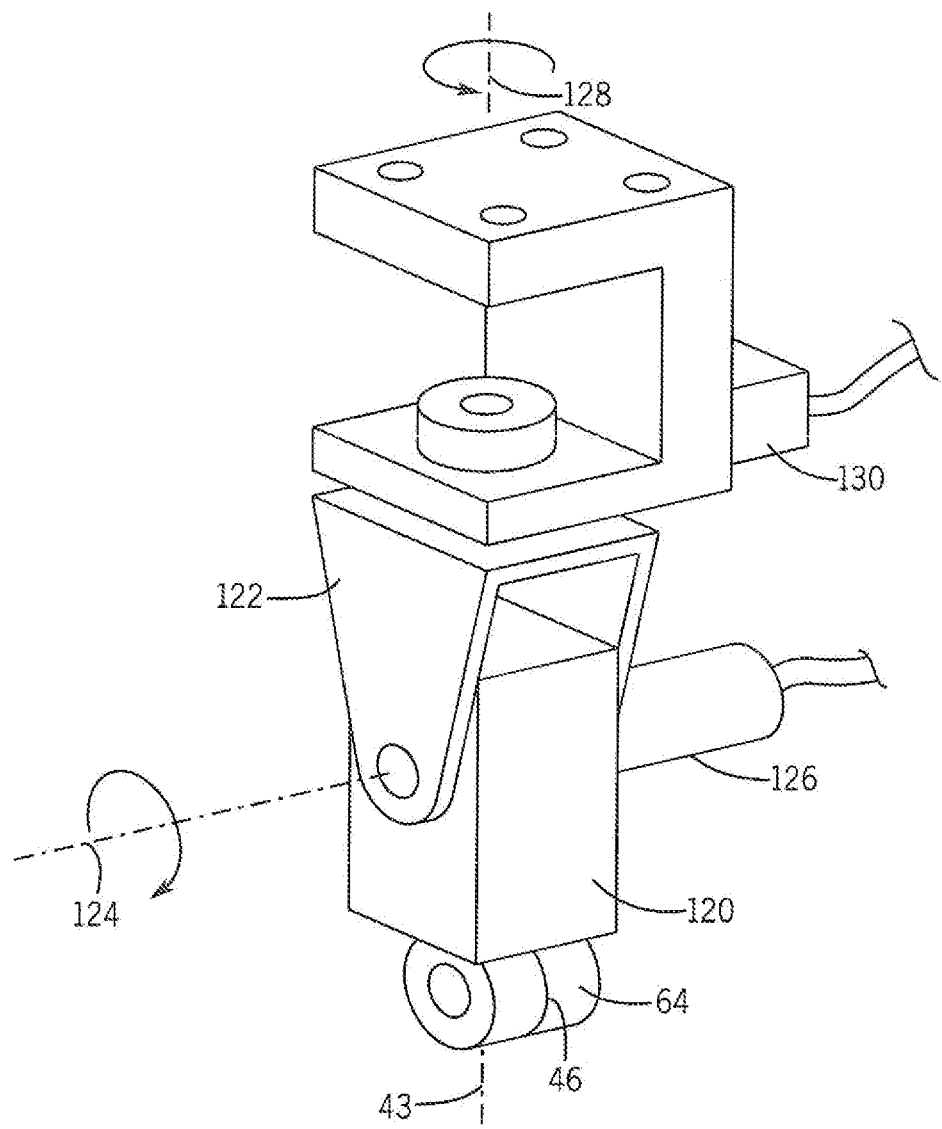
FIG. 7 is a perspective view of a mounting carriage for the pultrusion die and roller of FIG. 1 allowing two additional rotation axes of movement beyond the three axes provided by the Cartesian stage for three-dimensional fiber application.

Referring now to FIG. 7, in one embodiment, a housing 120 may contain each of the reservoirs 12, creel 18, pultrusion die 22, and elements of FIG. 1 downstream from the pultrusion die 22 up to and including the roller 64. This housing 120 may be mounted on a trunnion 122 allowing it to pivot through an axis 124 perpendicular to axis 43 and intersecting that axis. A motor 126 may provide for controlled rotation of the housing 120 about axis 124. The trunnion 122 may be, in turn, mounted on a swivel block to swivel about a second, axis 128 perpendicular to axis 124 under the control of a second motor 130. Motors 126 and 130 may be controlled by the computer 100 shown in FIG. 1.

Figure 8:
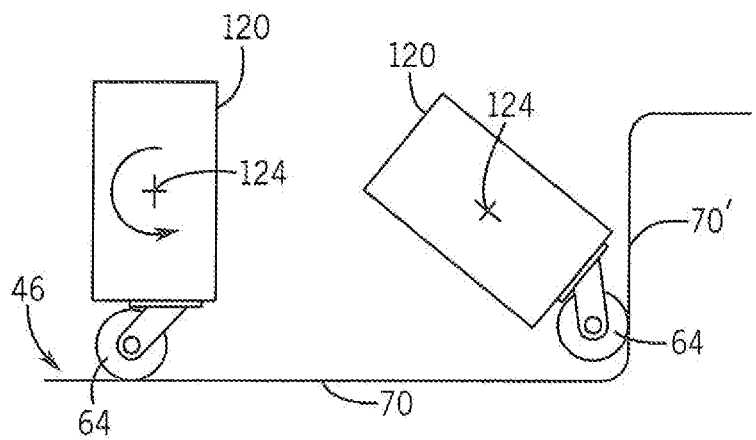
FIG. 8 is a simplified side elevational view of the assembly of FIG. 7 applying a filament in two perpendicular directions.

As shown in FIG. 8, this configuration allows the housing 120 to be rotated such that the roller 64 and hence the trajectory of adhered filament 46 may be applied not only to a surface 70 that is in a single horizontal plane hut also along other planes, for example, vertical surface 70' by rotation of the housing 120 about axis 124.

This also allows the reduction or elimination of support structure needed. However, if support structure is needed, low melting thermoplastic filament should be used in a second print head as will be discussed below. The melting temperature should be below the second curing temperature to avoid local cross-linking. During the final cure, the support structure should be melting at the same time.

Figure 9:
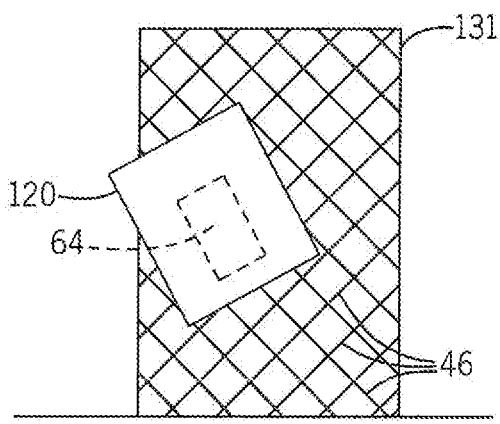
FIG. 9 is a figure similar to that of FIG. 8 showing application of a filament in a spiral around a cylinder.

Referring now to FIG. 9, simultaneous movement of the housing 120 about axes 124 and 128 allows, for example, for helical, winding of filament 46 about a cylindrical upstanding shape 131 or other complex, reinforced composite material construction.

Figure 10:
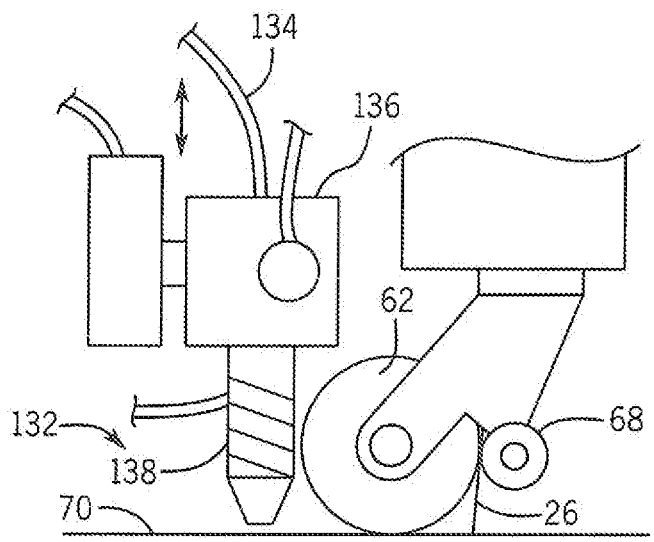
FIG. 10 is a fragmentary view similar to that of FIG. 4 showing a secondary thermoplastic printing head.

Referring now to FIG. 10, the present invention may be augmented with a secondary print head 132 being of conventional design for the additive printing of thermoplastic filament 134. As such, the secondary print head 132 may include a feeder motor assembly 136 feeding a thermoplastic filament 134 into a heated print nozzle 138 for depositing molten thermoplastic of the filament 134 on the surface 70 or previously printed materials. The secondary print head 132 may be mounted on a vertical stage 140 operated by the computer 100 to raise and lower the nozzle 136 so that one or the other of the nozzle 136 and roller 62 is in use and adjacent to the printed surface. The slight off set between the contact point of the roller 62 and the nozzle 138 may be accommodated by the computer 100 having this offset value as a prestored configuration value. Ideally, the thermoplastic of the filament 134 will be compatible with the thermoset of the filament 20, for example, epoxy resin and polyetherimide thermoplastics. In this way thermoplastic materials may be used to generate hybrid structures with enhanced toughness, surface, quality and joining features. In one variation, the thermoplastic doesn't become part of the structure, but is rather the support material needed during the build.

In one embodiment, the filament 134 may be a partially cured two-step curing thermoset filament to deposit the same thermoset resin with short and/or long chopped fibers of the same material, for example, in areas with less critical stresses or where the continuous fibers would need to be cut and thus don't add performance. By using two-step curing thermoset material, a long, shelf life is possible allowing the filament to be manufactured off-site.

Figure 11:
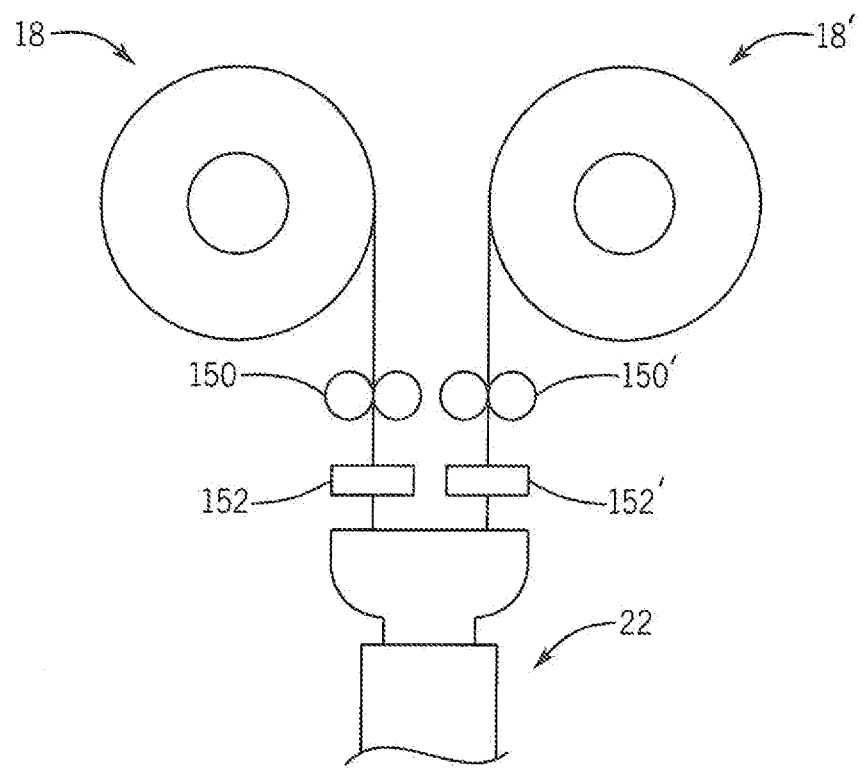
FIG. 11 is a figure of a dual creel system for changing the fibers used in printing during the printing process.

Referring now to FIG. 11, in an additional embodiment, multiple creels 18 and 18' may each be associated with a computer controlled capstan feed roller set 150 and 150' providing filament to separate computer controlled cutters 152 and 152' so that one of two types of fiber types may be feed to the pultrusion die 22 and used to form the strand 46, for example, glass vs. aramid fibers. In this way different fiber materials could be combined in on printed part depending of the needed performance of the printed segment. For example, carbon fibers give the part strength and stiffness whereas aramid fibers provide energy dissipation during crash situations.

Figure 12:
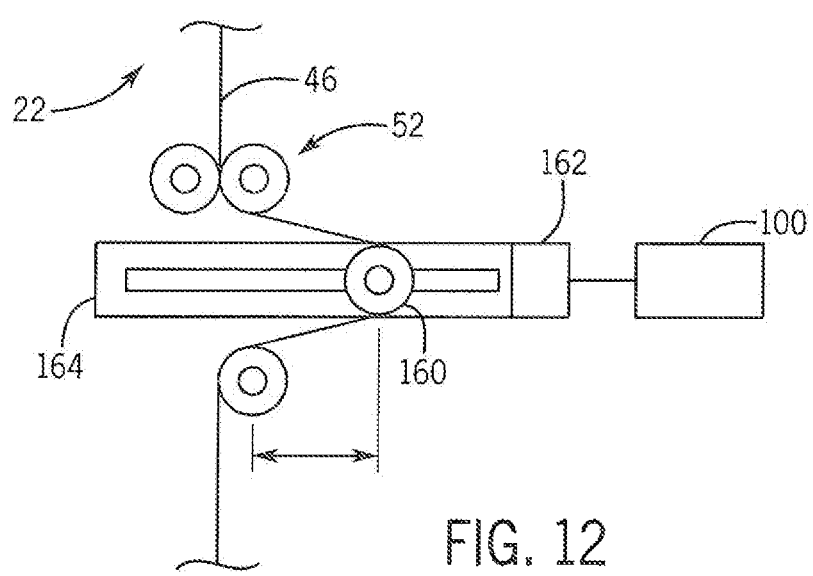
FIG. 12 is a fragmentary view of the mechanism of FIG. 4 showing a take-up roller for use for decoupling the printing speed from the pultrusion speed.

Referring now to FIGS. 2, 4, and 12, the computer 100 may control a take-up roller 160 movable by means of a motor 162 along a linear track 164 directed generally perpendicularly to the axis 43. Movement of the take-up roller 160 laterally allows storage of variable amounts of filament 46 when the printing speed at which filament is applied to surface 70 (shown in FIG. 4) is decreased with respect to the rate by which motorized rollers 52 pull filament through the pultrusion die 22. By decoupling these two rates, the pultrusion rate may be rendered substantially constant greatly improving process control. In this respect, the computer 100 may also control the temperature, of resistive heating element 44, for example, to decrease curing temperature at low payout speeds and of course to turn off curing when filament is not required.

Generally the reinforcing fibers should not be limited to the materials described above that may include any filamentatious material different from the surrounding thermoset matrix that can impart improved strength properties to the ultimate composite product. Continuous fibers are understood as fibers with length greater than 50 mm. The term roller should be understood not to be limited to circular wheels but to include mechanisms providing a non-sliding movable pressure at a point or line of contact including, for example, wheels, belts and the like.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a circuit" a "microprocessor" and "a processor" or "the microprocessor" and "the processor," can be understood to include one or more circuits or microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. A single microprocessor or, similar computer executing different programs may provide different circuits by virtue of the programs control of current flow in hardware. Accordingly, it will be understood that the invention contemplates that the described circuits for example the exception management circuitry, may be implemented flexibly through discrete circuitry, microcoding (firmware) and associated processing circuitry, gate arrays, and general-purpose processors executing programs including special application programs and/or operating system functions.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

The invention claimed is:

1. A method of additive manufacturing comprising:
   (a) impregnating reinforcing fibers extending along a filament axis with an uncured thermoset material having a first reaction temperature and a second higher reaction temperature to produce an impregnated three-state filament where the fibers are multi-stranded, substantially parallel to the filament axis and have a length of at least 50 mm and comprise at least 50 percent of a volume of the filament, the thermoset material providing: (1) a first state with an uncompleted first chemical reaction between a first reactant and a second reactant in the thermoset material and an uninitiated second chemical reaction with a third reactant in the thermoset material, (2) a second state having the first chemical reaction completed and the second chemical reaction uninitiated so that the filament has an adhesive outer surface, and (3) a third state with the first chemical reaction and the second chemical reaction completed;
   (b) heating the impregnated filament to the first reaction temperature but less than the second higher reaction temperature to transition the filament from the first state to the second state;
   (c) cooling the filament in the second state to provide mechanical tractability with reduced adhesion in the outer surface;
   (d) using a roller to conduct the cooled filament in the second state to a print surface;
   (e) reheating the filament to restore adhesion without completion of the cure of the thermoset material;
   (f) applying the filament in the second state in multiple layers over an area to construct a three-dimensional object of filament segments retained in position by inter-engagement of their outer adhesive surfaces; and
   (g) heating the three-dimensional object to the second higher reaction temperature to transition the filament from the second state to the third state;
   wherein, the heating of step (b) is performed in a pultrusion die in which the reinforcing fibers are impregnated with the uncured thermoset material;
   further including, a step of pulling the fibers during steps (a) and (b) using at least one motorized roller engaging the impregnated filament downstream the cooling of step (c);
   wherein, the motorized roller provides a substantially constant rate of pulling of the fibers during steps (a) and (b) and further including, a take-up guide having a first guiding surface and a second guiding surface providing a variable separation therebetween and receiving filament after the motorized roller to temporarily store variable amounts of filament in the variable separation before it is applied at step (e) when an application rate of the three-state filament to a previous layer differs from the constant rate of pulling of the fibers.

2. The method of claim 1 further including, the step of periodically cutting the three-state filament in between applications of three-state filament to previous layers of three-state filament.

3. The method of claim 1 wherein, the reheating of the three-state filament directly heats the outer surface of the three-state filament in comparison to an inner core of the three-state filament.

4. The method of claim 1 wherein, step (f) presses the three-state filament to an earlier layer of three-state filament using the roller.

* * * * *